Aug. 11, 1964       J. W. LYNN ETAL       3,144,396
PROCESS FOR PURIFICATION OF N-ALKYL-N-VINYL AMIDES
Filed Dec. 2, 1959
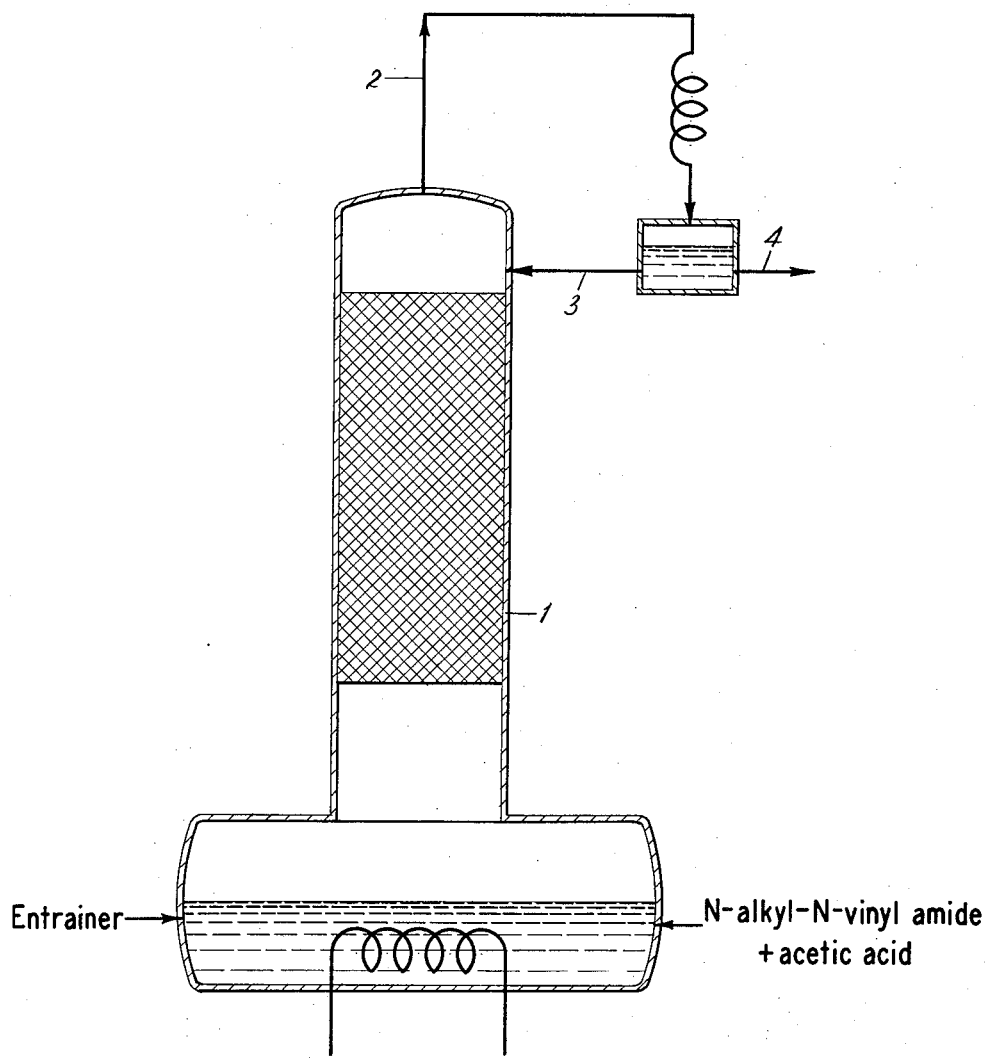
INVENTORS
JOHN W. LYNN
BERTRAND D. ASH
ATTORNEY

United States Patent Office 3,144,396
Patented Aug. 11, 1964

3,144,396
PROCESS FOR PURIFICATION OF
N-ALKYL-N-VINYL AMIDES
John W. Lynn, Charleston, and Bertrand D. Ash, St. Albans, W. Va., assignors to Union Carbide Corporation, a corporation of New York
Filed Dec. 2, 1959, Ser. No. 856,673
7 Claims. (Cl. 202—42)

This invention relates to the azeotropic removal of acetic acid from an N-alkyl-N-vinyl amide.

The compounds N-alkyl-N-vinyl amides are known in the art as valuable monomers in the preparation of water-soluble resins. Therefore, considerable interest has attached to the synthesis of these compounds.

One known method for the preparation of N-alkyl-N-vinylacetamide is by the vinylation of N-alkylacetamides with acetylene at about 300 p.s.i. total pressure in the presence of strongly alkaline catalysts. Thus:

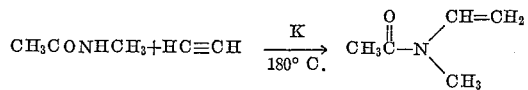

In this process, no acetic acid is formed and the separation problem does not exist. However, this is not an economically suitable method for the preparation of N-alkyl-N-vinylacetamide due to the difficulties encountered in using acetylene under high pressure and the high cost of necessary equipment for this operation.

A much more economical process for the synthesis of N-alkyl-N-vinylacetamides consists in (1) the hydroxyethylation of a lower alkylamine with ethylene oxide; (2) acetylation of the alkanolamine with acetic anhydride or ketene; and (3) pyrolysis of the acetate. These steps may be represented as follows:

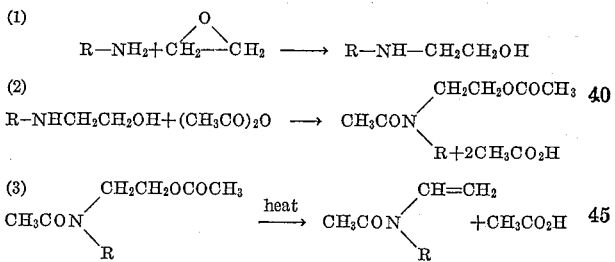

R in the above formula is an aliphatic group.

The reaction mixture resulting from the pyrolysis of an N-(2-acetoxyethyl)-N-alkylacetamide consists of a mixture of acetic acid, N-alkyl-N-vinylacetamide, N-alkylacetamide, N-(2-acetoxyethyl)-N-alkylacetamide and undistillable residue. It is an easy matter to separate by distillation a fraction consisting of acetic acid and N-alkyl-N-vinylacetamide from the other components of the reaction mixture. However, though there exists a substantial difference in boiling points between acetic acid and the N-alkyl-N-vinylacetamide, it is not possible to separate a mixture of the two by fractional distillation. This is because N-vinyl-N-alkylacetamide forms an azeotropic or constant-boiling mixture with acetic acid. As shown in Example 3 of U.S. Patent 2,231,905 to Hanford et al., it has previously been necessary to separate acetic acid from N-alkyl-N-vinylacetamide by treatment of the reaction mixture with an alkali metal carbonate to form a highly water-soluble alkali metal salt of acetic acid. This was followed by extraction of the N-alkyl-N-vinylacetamide from the aqueous solution with a water-immiscible organic liquid. This procedure suffers many disadvantages such as increased cost due to the additional operation required for the neutralization-extraction process, expense involved in using an alkali metal carbonate, the necessity of subsequently recovering acetic acid from the aqueous solution of its salt, and the resultant losses of the highly water-soluble N-alkyl-N-vinylacetamide in the extraction step.

Accordingly, it is an object of this invention to provide a convenient and economical means for the removal of acetic acid from an N-alkyl-N-vinyl amide.

The present invention is based on our discovery that acetic acid may be removed from a mixture of acetic acid and an N-alkyl-N-vinyl amide by adding to the mixture an entrainer which forms a minimum-boiling azeotrope with acetic acid and separating this azeotrope from the N-alkyl-N-vinyl amide by distillation. The resulting distilled N-alkyl-N-vinyl amide is of sufficient purity for use in polymer formation.

The separation technique of this invention may be applied to any mixture of acetic acid and an N-alkyl-N-vinylalkyl amide such as that obtained by the pyrolysis of an N-(2-acetoxyethyl)-N-alkylalkyl amide as hereinbelow described.

According to this invention, acetic acid may be removed from any N-alkyl-N-vinyl amide such as those represented by the following formula:

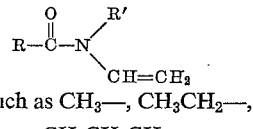

where R is alkyl such as $CH_3-$, $CH_3CH_2-$, $-CH_3CH_2CH_2-$ or $(CH_3)_2CH-$ and R' is lower alkyl such as $CH_3-$, $CH_3CH_2-$, $CH_3CH_2CH_2-$ or $(CH_3)_2CH-$.

The entrainer which may be added to the mixture of acetic acid and N-alkyl-N-vinyl amide may be any compound which forms a minimum-boiling azeotrope with acetic acid. It is advantageous to use an entrainer which combines with acetic acid to yield an azeotrope having a relatively high concentration of acetic acid since this will require the addition of a minimum amount of entrainer and consequently, a shorter time will be required for separation. The entrainer is preferably a neutral substance possessing high thermal and chemical stability. Table I sets forth a partial list of suitable entrainers which may be used in the process of this invention.

TABLE I

| Agent | Boiling point, °C. | Boiling point of azeotrope, °C. | Acetic acid in azeotrope, percent |
|---|---|---|---|
| Benzene | 80.2 | 80.1 | 2 |
| Toluene | 110.7 | 105.4 | 28 |
| Ethylbenzene | 136 | 114.7 | 66 |
| o-Xylene | 143 | 116 | 74 |
| m-Xylene | 139 | 115.4 | 72.5 |
| p-Xylene | 138.4 | 115 | 72 |
| n-Heptane | 98.4 | 91.9 | 33 |
| Methylcyclohexane | 101.1 | 96.3 | 31 |
| n-Octane | 125.8 | 105 | 52.5 |
| Dibutyl ether | 142.1 | 116.7 | 81 |
| 1-chloro-3-methylbutane | 99.8 | 97.2 | 18.5 |

One method of practicing the instant invention is illustrated in the accompanying drawing wherein a mixture of N-alkyl-N-vinyl amide and acetic acid are charged together with an entrainer, such as listed in Table I, to the bottom of a packed distillation tower (1). The acetic acid is removed from the N-alkyl-N-vinyl amide through the minimum boiling azeotrope formed by the entrainer and acetic acid which distills first and exits overhead through line 2, is condensed, and is removed through line 4, some distillate being returned to the column via line 3 as reflux. After the minimum boiling azeotrope has been distilled off the N-alkyl-N-vinyl amide may be subsequently distilled in a similar manner in purity sufficient for use in polymer formation.

Specific embodiments of this invention are set out in Examples 2 through 6 below. Examples 1 and 6 show that it is not possible to efficiently separate acetic acid and a lower N-alkyl-N-vinyl amide by fractional distillation.

Example 1

ATTEMPTED SEPARATION OF ACETIC ACID FROM N-ETHYL-N-VINYLACETAMIDE BY FRACTIONAL DISTILLATION

N-(2-acetoxyethyl)-N-ethylacetamide was fed to a 3-foot section of 1-inch I.D. stainless steel pipe heated to 450° C. by means of a jacket containing a salt mixture which was, in turn, heated by direct electrical winding of resistance wire on the exterior of the jacket. The feed rate was maintained at about 3.5 cm.³ per minute. The tube effluent was condensed and transferred to a still system in which a fraction boiling from 60° C. at 20 mm. to 105° C. at 4 mm. was distilled off. This crude distillate (364 grams) containing acetic acid, N-ethyl-N-vinylacetamide and some N-ethylacetamide was charged to a 1-liter still kettle equipped with a 1″ x 66′ jacketed glass column packed with stainless steel protruded chips and an automatic still head. Distillation was carried out using a 10 to 1 reflux ratio.

| Cut No. | Kettle, °C. | Head, °C. | Pressure, mm. Hg | Weight, grams | Refractive Index, n 30/D | Acetic acid,[1] percent |
|---|---|---|---|---|---|---|
|  | 97 | 47 | 50 |  |  |  |
| 1 | 97 | 46 | 50 | 57 |  | 97.9 |
| 2 | 87 | 62 | 12 | 9 |  | 96.3 |
| 3 | 87 | 58 | 10 | 3 | 1.4480 | 27.3 |
| 4 |  |  |  | 8 | 1.4520 | 24.7 |
| 5 |  | 58 | 11 | 12 |  | 21.5 |
| 6 | 97 | 57 | 10 | 19 | 1.4566 | 19.5 |
| 7 | 103 | 56 | 10 | 25 | 1.4597 | 16.6 |
| 8 | 114 | 58 | 10 | 20 | 1.4629 | 11.3 |
| 9 | 180 | 55 | 10 | 32 | 1.4682 | 4.2 |
| 10 | 200 | 44 | 5 | 11 | 1.4700 | 2.3 |
| 11[2] | 90 | 63 | 10 | 15 | 1.4702 | 0.6 |
| 12 | 100 | 79 | 10 | 14 |  | 0.8 |
| 13 | 100 | 87 | 10 | 6 |  | 1.7 |
| 14 | 180 | 93 | 10 | 28 |  | 1.1 |
| 15 | 212 | 80 | 6 | 4 |  | 1.3 |
| Residue |  |  |  | 19 |  |  |
| Cold Trap |  |  |  | 4 |  |  |

[1] Titration with 0.5 N sodium hydroxide.
[2] Transferred to a 4 x 30 cm. packed column.

The physical properties for the pure components are:

|  | Boiling point, °C. | mm. Hg | n 30/D |
|---|---|---|---|
| Acetic acid | 18 | 10 | 1.3709 |
| N-ethyl-N-vinylacetamide | 60 | 10 | 1.4704 |
| N-ethylacetamide | 95 | 10 | 1.4303 |
| N-(2-acetoxyethyl)-N-ethyl-acetamide | 110 | 3 | 1.4482 |

The following conclusions are drawn from consideration of these data:

(1) Cuts 1 and 2 are mostly acetic acid.
(2) Cuts 3 through 8 are a mixture of acetic acid and N-ethyl-N-vinylacetamide.
(3) Cuts 9 through 11 are mostly N-ethyl-N-vinylacetamide.
(4) Cuts 12 through 15 are mostly N-ethylacetamide.

It thus is shown that separation of N-ethyl-N-vinylacetamide from acetic acid is not practicable by fractional distillation even with the use of a highly efficient distillation column.

Example 2

AZEOTROPIC SEPARATION OF ACETIC ACID FROM N-ETHYL-N-VINYLACETAMIDE WITH N-HEPTANE

A mixture of 33 grams of N-ethyl-N-vinylacetamide, 10 grams of acetic acid and 86 grams of n-heptane was distilled on a ¾″ x 12″ packed column to give 36 grams of azeotrope containing 16.5 percent acetic acid and 44 grams of azeotrope containing 8.3 percent acetic acid (9.5 grams total acetic acid). The residual material contained only 1.17 percent acetic acid.

Example 3

HIGH-PURITY N-ETHYL-N-VINYLACETAMIDE

A 198 gram sample of tube effluent as described in Example 1 was distilled through a ¾″ x 12″ packed glass column to give 89 grams of a fraction boiling from 60° C. to 70° C. at 20 mm., n 30/D 1.4475, which contained 29.7 percent acetic acid. This cut plus 180 grams of n-heptane was charged to a still kettle equipped with a ¾″ x 20″ packed glass column and distilled.

| Cut No. | Head, °C. | Pressure, mm. Hg | Weight, grams | Refractive Index, n 30/D | Acetic acid, percent |
|---|---|---|---|---|---|
| 1 | 91-94 |  | 125 | 1.3778 | 18.8 |
| 2 | 94-96 |  | 20 | 1.3830 |  |
| 3 |  |  | 51 | 1.3845 |  |
| 4 | 57 | 8 | 2 | 1.4714 |  |
| 5 | 57 | 8 | 46 | 1.4715 |  |

Cut number 5 was analyzed by infrared spectrometer and mass spectrometer. No impurities could be detected and the acetic aid concentration was nil.

Example 4

USE OF DIBUTYL ETHER AS AZETROPING AGENT

A 962 gram fraction consisting of acetic acid and N-ethyl-N-vinylacetamide was distilled from 3671 grams of tube effluent prepared as described in Example 1. This fraction was charged to a still kettle equipped with a 1″ x 4′ glass column packed with protruded 0.16-inch stainless steel chips together with 932 grams of dibutyl ether and distilled.

| Time, hrs.:min. | Kettle, °C. | Head, °C. | Pressure, mm. Hg | Weight, grams | Acetic acid, percent |
|---|---|---|---|---|---|
| 10:00 |  |  |  |  |  |
| 13:30 | 84-90 | 58-68 | 100 | 449 | 50.4 |
| 14:50 | 78 | 63 | 50 | 307 | 17.4 |
| 16:10 | 64 | 44 | 20 | 273 | 0.5 |

The dibutyl ether was removed and the product was fractionally distilled to give N-ethyl-N-vinylacetamide which contained only a small amount (about 1 percent) acetic acid. This monomer, however, polymerized in a satisfactory manner.

Example 5

PURIFICATION OF N-METHYL-N-VINYLACETAMIDE

N-(2-acetoxyethyl)-N-methylacetamide was fed to the tubular reactor described in Example 1 at 450° C. and a feed rate which gave a residence time of 15 seconds. The tube effluent was distilled through a 1″ x 12″ packed glass column to give a fraction boiling from 60° C. to 80° C. at 30 mm. Hg (n 30/D, 1.4429; 27.1 percent acetic acid). This cut was charged along with an equal weight of n-heptane to a still system equipped with a 1″ x 60″ glass column packed with stainless steel protruded chips and distilled. The acetic acid-n-hepane azeotrope was removed until the concentration of acetic acid in the kettle contents was about 1 percent. Distillation of the remaining material gave N-methyl-N-vinylacetamide (boiling point 58°/13 mm.; n 30/D, 1.4791; 0.3 percent acetic acid) which polymerized satisfactorily.

Example 6

N-ISOPROPYL-N-VINYLACETAMIDE

N-(2-acetoxyethyl)-N-isopropylacetamide (1000 grams, 5.35 mols) was fed to the tubular reactor described in Example 1 at 450° C. and a feed rate which gave about a 15-second residence time. The tube effluent was charged to a 1' x 30" packed glass column and carefully distilled. The data shown below indicate a clean separation of acetic acid from N-isopropyl-N-vinylacetamide is not possible.

| Cut | Boiling point | | n 30/D | Weight, grams | Acetic acid, percent |
|---|---|---|---|---|---|
| | ° C. | mm. | | | |
| 1 | 50–75 | 50 | 1.3897 | 35 | 85.2 |
| 2 | 50–72 | 20 | 1.4120 | 70 | 65.0 |
| 3 | 67 | 15 | 1.4446 | 332 | 22.5 |
| 4 | 73–80 | 3 | 1.4319 | 73 | 10.65 |
| 5 | 120 | 2 | 1.4506 | 333 | |
| Residue | | | | 59 | |

Cuts 1, 2, 3 and 4 were composited and were azeotropically distilled with 1000 grams of n-heptane to remove acetic acid over a 5-hour period.

| Cut | Temperature, ° C. | Reflux ratio | Cm.³ | n 30/D | Acetic acid, percent |
|---|---|---|---|---|---|
| 1 | 88 | 3 | 120 | 1.3745 | 29 |
| 2 | 90 | 3 | 250 | 1.3775 | 17 |
| 3 | 90 | 6 | 240 | 1.3775 | 17.5 |
| 4 | 92 | 6 | 105 | 1.3792 | 11.5 |
| 5 | 92 | 10 | 45 | 1.3788 | 12 |
| 6 | 93 | 10 | 120 | 1.3788 | 12 |
| 7 | 93 | 10 | 70 | 1.3802 | 8.5 |
| 8 | 94 | 10 | 180 | 1.3806 | 6.2 |
| 9 | 94 | 15 | 160 | 1.3809 | 6.2 |
| 10 | 94 | 15 | 90 | 1.3818 | 3.2 |

Kettle contents analyzed 2.67 percent as acetic acid. Distillation of the residual material gave 258 grams, a 38 percent yield, of product (boiling point, 74°/20 mm.; n 30/D, 1.4587; d 20/20, 0.9120.

*Analysis.*—Calculated for $C_7H_{13}NO$: C, 66.15; H, 10.23; N, 11.0. Found: C, 65.97; H, 10.21; N, 11.45.

What is claimed is:

1. A process for recovering N-alkyl-N-vinylamides from an admixture of said amide and acetic acid, said admixture capable of forming an azeotrope of the amide and acetic acid, which process comprises adding to the admixture an entrainer selected from the group consisting of benzene, toluene, ethyl benzene, xylene, heptane, methylcyclohexane, octane, dibutyl ether and 1-chloro-3-methyl-butane and distilling the acetic acid from the mixture as a minimum boiling azeotrope with the entrainer.

2. The process according to claim 1 wherein the N-alkyl-N-vinyl amide is N-alkyl-N-vinyl alkanamide having N-alkyl moieties of 1 to 3 carbons and alkanamido moieties of 2 to 4 carbons.

3. The process of claim 2 wherein the N-alkyl-N-vinylamide is N-alkyl-N-vinylacetamide wherein the N-alkyl moiety has 1 to 3 carbon atoms.

4. The process according to claim 3 wherein the N-alkyl-N-vinylacetamide is N-ethyl-N-vinylacetamide and the entrainer is n-heptane.

5. The process according to claim 3 wherein the N-alkyl-N-vinylacetamide is N-ethyl-N-vinylacetamide and the entrainer is dibutyl ether.

6. The process according to claim 3 wherein the N-alkyl-N-vinylacetamide is N-methyl-N-vinylacetamide and the entrainer is n-heptane.

7. The process according to claim 3 wherein the N-alkyl-N-vinylacetamide is N-isopropyl-N-vinylacetamide and the entrainer is n-heptane.

References Cited in the file of this patent

UNITED STATES PATENTS

| | | |
|---|---|---|
| 2,231,905 | Hanford et al. | Feb. 18, 1941 |
| 2,423,545 | Aeschbach | July 8, 1947 |

OTHER REFERENCES

Azeotropic Data, Horsley, American Chemical Society, Washington, D.C., 1952, page 49.